(12) United States Patent
Boos et al.

(10) Patent No.: US 10,526,810 B1
(45) Date of Patent: Jan. 7, 2020

(54) FLAG POLE SUPPORT APPARATUS

(71) Applicants: Dion Todd Boos, Monticello, MN (US); Jordan Michael Boos, Monticello, MN (US)

(72) Inventors: Dion Todd Boos, Monticello, MN (US); Jordan Michael Boos, Monticello, MN (US)

( * ) Notice: Subject to any disclaimer, the term of this patent is extended or adjusted under 35 U.S.C. 154(b) by 0 days.

(21) Appl. No.: 15/803,322

(22) Filed: Nov. 3, 2017

(51) Int. Cl.
*E04H 12/22* (2006.01)
*G09F 17/00* (2006.01)
*F16M 11/10* (2006.01)
*A01K 97/10* (2006.01)

(52) U.S. Cl.
CPC .......... *E04H 12/2284* (2013.01); *A01K 97/10* (2013.01); *F16M 11/10* (2013.01); *G09F 17/00* (2013.01); *G09F 2017/0066* (2013.01)

(58) Field of Classification Search
CPC ................ E04H 12/2284; A01K 97/10; G09F 2017/0066; G09F 17/00; F16M 11/10
See application file for complete search history.

(56) References Cited

U.S. PATENT DOCUMENTS

| | | | | | |
|---|---|---|---|---|---|
| 235,106 | A | * | 12/1880 | Steiner | A01K 97/10 248/515 |
| 1,525,515 | A | * | 2/1925 | Socha | B60R 13/00 248/514 |
| 2,416,828 | A | * | 3/1947 | Hamre | A01K 97/10 248/515 |
| 2,430,112 | A | * | 11/1947 | Hamre | A01K 97/10 224/406 |
| 2,540,584 | A | * | 2/1951 | Ellsworth | A01K 97/10 224/922 |
| 3,484,066 | A | * | 12/1969 | Aunspaugh | A01K 97/10 248/229.22 |
| D230,730 | S | * | 3/1974 | Ingram | D22/147 |
| 4,852,291 | A | * | 8/1989 | Mengo | A01K 97/10 43/21.2 |
| D307,171 | S | * | 4/1990 | Engle | D22/147 |
| 4,932,152 | A | * | 6/1990 | Barlotta | A01K 97/10 248/515 |
| 5,247,759 | A | * | 9/1993 | Noriega | A01K 97/10 248/279.1 |
| 5,431,364 | A | * | 7/1995 | Etter | A45B 11/00 135/16 |
| 5,588,630 | A | * | 12/1996 | Chen-Chao | F16C 11/10 248/514 |
| 5,836,327 | A | * | 11/1998 | Davis | A45B 11/00 135/16 |
| 6,088,946 | A | * | 7/2000 | Simmons | A01K 97/11 248/535 |
| 6,262,691 | B1 | * | 7/2001 | Austin | H01Q 1/1221 343/878 |
| 6,407,713 | B1 | * | 6/2002 | Mallenius | F16M 11/10 343/765 |
| 6,452,567 | B1 | * | 9/2002 | Overton | H01Q 1/088 343/882 |

(Continued)

*Primary Examiner* — Eret C McNichols

(57) ABSTRACT

A flag pole support apparatus for effectively and efficiently supporting a flag pole to any types of objects. The flag pole support apparatus includes a bracket assembly adapted to removably fasten to an object; and a support assembly removably mounted to the bracket assembly and adapted to support a flag pole.

6 Claims, 4 Drawing Sheets

(56) References Cited

U.S. PATENT DOCUMENTS

| | | | | |
|---|---|---|---|---|
| 6,768,474 B2* | 7/2004 | Hunt | H01Q 1/1228 | 248/218.4 |
| 6,898,893 B1* | 5/2005 | Mukdaprakorn | A01K 97/10 | 248/518 |
| 7,113,145 B1* | 9/2006 | Noble | H01Q 1/1228 | 248/218.4 |
| 7,232,099 B1* | 6/2007 | Wilcox | B63B 25/002 | 248/228.1 |
| 7,618,015 B2* | 11/2009 | Jahnz | B60R 13/00 | 211/60.1 |
| 7,774,973 B2* | 8/2010 | Carnevali | A01K 97/10 | 248/276.1 |
| 7,878,139 B1* | 2/2011 | Karnes | G09F 17/00 | 116/173 |
| 7,918,425 B2* | 4/2011 | Rathbone | H01Q 1/1228 | 248/228.1 |
| 7,941,964 B2* | 5/2011 | Stanton | A01K 97/10 | 248/512 |
| 8,336,837 B2* | 12/2012 | Gephart | F16B 2/12 | 248/218.4 |
| 8,800,196 B2* | 8/2014 | Baumann | A01K 97/10 | 248/534 |
| 8,893,417 B2* | 11/2014 | Miller | G09F 15/00 | 116/28 R |
| 9,123,987 B2* | 9/2015 | Lettkeman | F16M 13/02 | |
| 9,337,545 B2* | 5/2016 | Lettkeman | H01Q 1/125 | |
| 9,532,559 B1* | 1/2017 | Hemmerlin | A01K 97/10 | |
| 9,791,101 B1* | 10/2017 | Frankel | F16M 13/022 | |
| 2002/0196195 A1* | 12/2002 | Vermette | H01Q 1/1228 | 343/882 |
| 2003/0122045 A1* | 7/2003 | Mulford | A01M 31/02 | 248/231.71 |
| 2003/0146364 A1* | 8/2003 | Gates | B62J 11/00 | 248/534 |
| 2004/0135047 A1* | 7/2004 | Hunt | F16M 13/02 | 248/229.14 |
| 2006/0102822 A1* | 5/2006 | Liang | F16C 11/10 | 248/514 |
| 2007/0044367 A1* | 3/2007 | Slatter | A01K 97/10 | 43/21.2 |
| 2007/0132655 A1* | 6/2007 | Lin | H01Q 1/12 | 343/880 |
| 2010/0252711 A1* | 10/2010 | Buchner | E04H 12/2269 | 248/539 |
| 2010/0288897 A1* | 11/2010 | Chang | G09F 7/18 | 248/229.22 |
| 2011/0074652 A1* | 3/2011 | Lewry | H01Q 1/125 | 343/882 |
| 2012/0026065 A1* | 2/2012 | Lo | H01Q 1/1228 | 343/890 |
| 2013/0333268 A1* | 12/2013 | Henry, Jr. | A01K 97/10 | 43/4.5 |
| 2014/0021316 A1* | 1/2014 | Adams | F16B 2/12 | 248/316.6 |
| 2016/0284253 A1* | 9/2016 | Williams, Jr. | G09F 17/00 | |
| 2018/0020651 A1* | 1/2018 | Larkin | A01K 97/10 | 43/21.2 |
| 2018/0353357 A1* | 12/2018 | Lane | A61G 5/10 | |

* cited by examiner

FLAG POLE SUPPORT APPARATUS

BACKGROUND OF THE INVENTION

Field of the Invention

The present invention relates to pole mounts and more particularly pertains to a new flag pole support apparatus for effectively and efficiently supporting a flag pole to any types of objects.

Description of the Prior Art

The use of pole mounts is known in the prior art. More specifically, pole mounts heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents do not disclose a new flag pole support apparatus.

SUMMARY OF THE INVENTION

The general purpose of the present invention, which will be described subsequently in greater detail, is to provide a new flag pole support apparatus which has many of the advantages of the pole mounts mentioned heretofore and many novel features that result in a new flag pole support apparatus which is not anticipated, rendered obvious, suggested, or even implied by any of the prior art pole mounts, either alone or in any combination thereof. The present invention includes a bracket assembly adapted to removably fasten to an object; and a support assembly removably mounted to the bracket assembly and adapted to support a flag pole. None of the prior art includes the combination of the elements of the present invention.

There has thus been outlined, rather broadly, the more important features of the flag pole support apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new flag pole support apparatus which has many of the advantages of the pole mounts mentioned heretofore and many novel features that result in a new flag, pole support apparatus which is not anticipated, rendered obvious, suggested, or even implied by any of the prior art pole mounts, either alone or in any combination thereof.

Still another object of the present invention is to provide a new flag pole support apparatus for effectively and efficiently supporting a flag, pole to any types of objects.

Still yet another object of the present invention is to provide a new flag pole support apparatus that can be attached to a vehicle without having to be removed when not in use since it can be rotated to different positions as desired to get it out of the way.

Even still another object of the present invention is to provide a new flag pole support apparatus where the bracket member remains fastened the object and the flag pole hole can be completely removed as desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
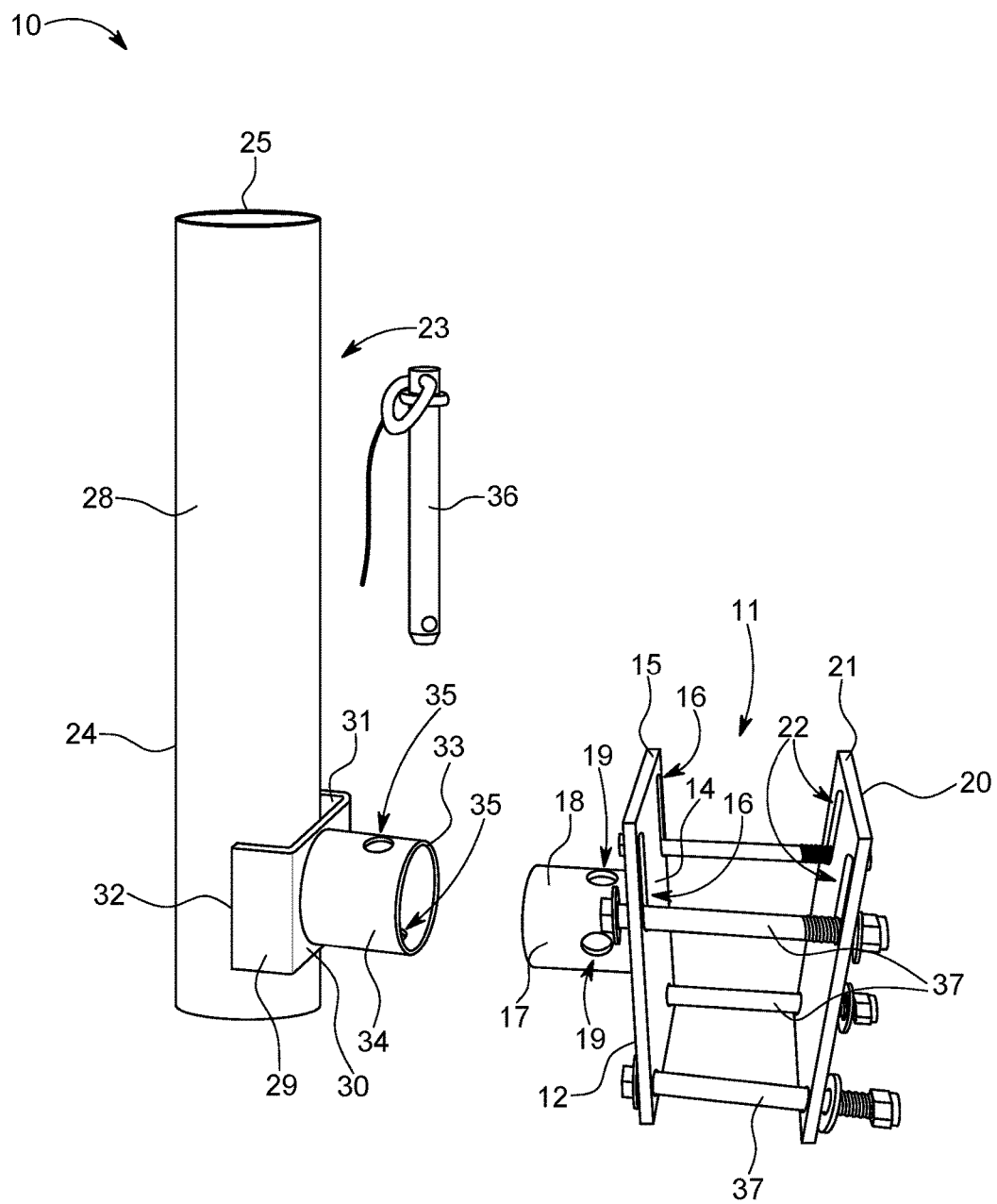
FIG. 1 is an exploded perspective view of a new flag, pole support apparatus according to the present invention.
Figure 2:
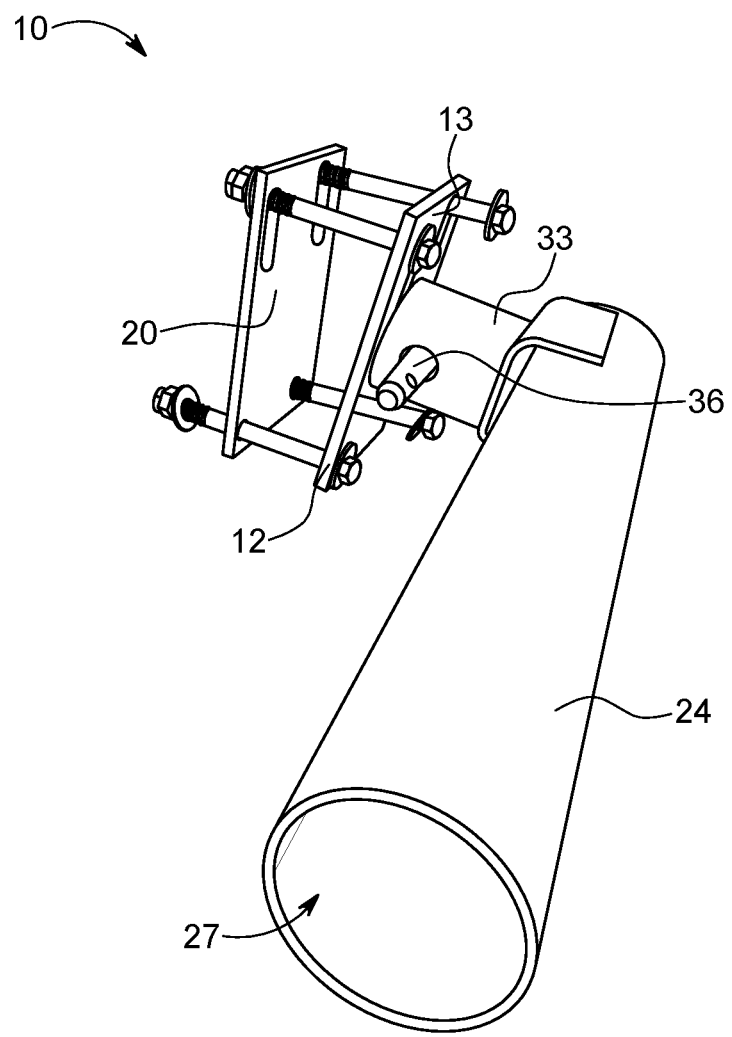
FIG. 2 is a top perspective view of the present invention.
Figure 3:
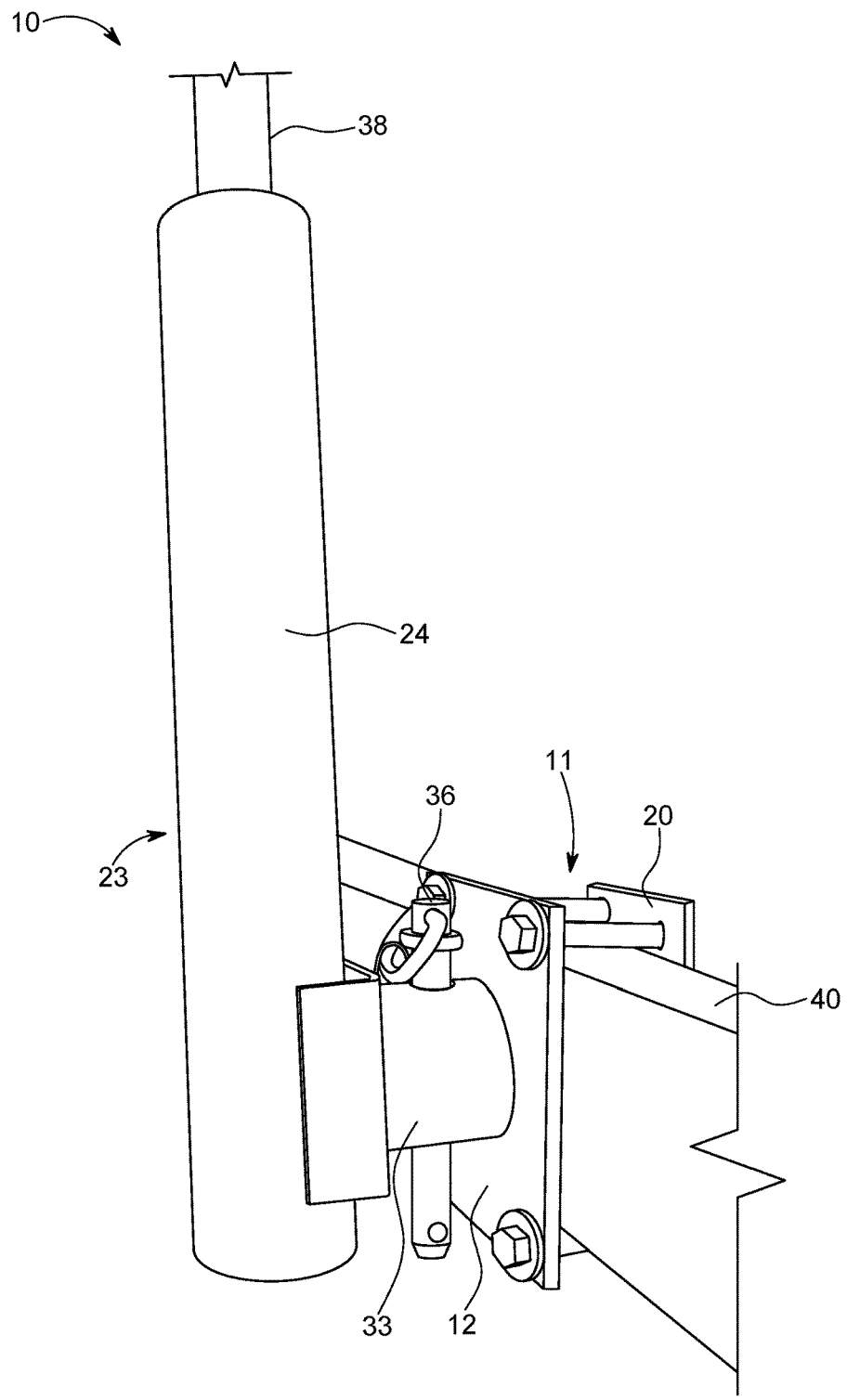
FIG. 3 is a perspective view of the present invention mounted to a bumper of a vehicle.
Figure 4:
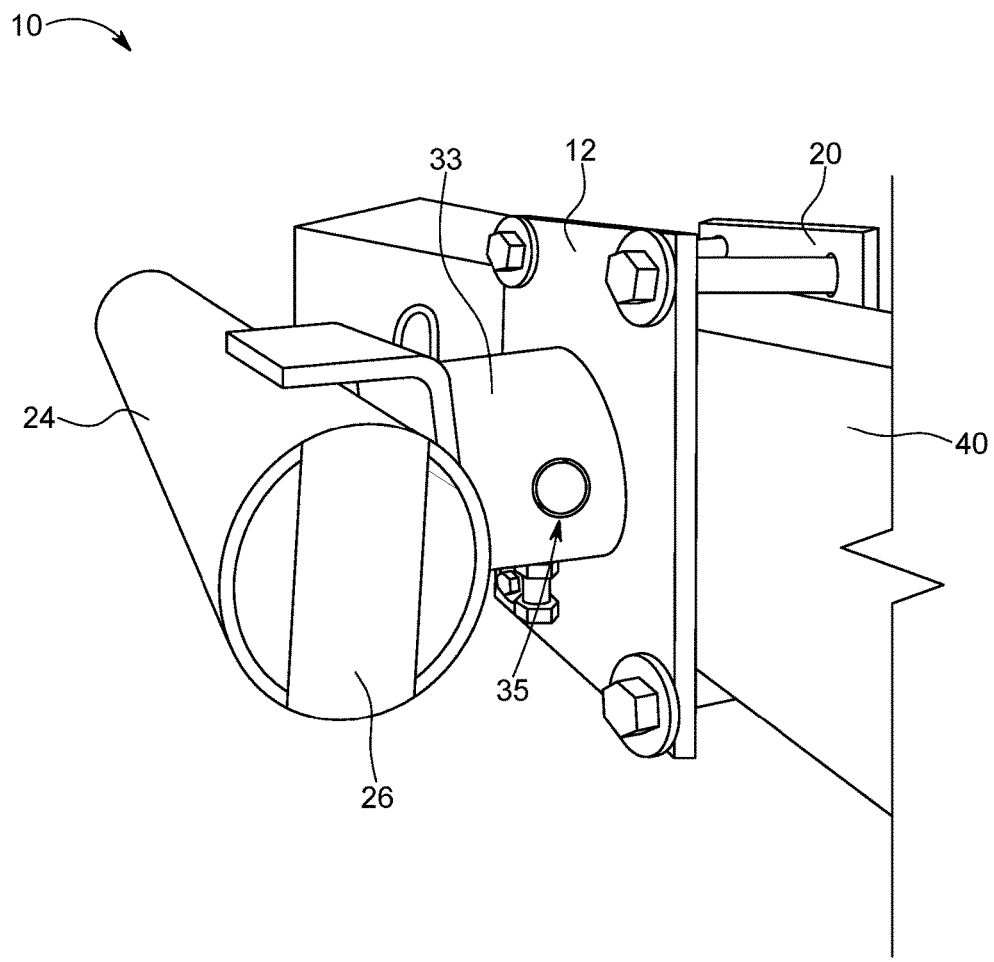
FIG. 4 is a perspective view of the present invention mounted to a bumper of a vehicle.

With reference now to the drawings, and in particular to FIGS. 1 through 4 thereof, a new flag pole support apparatus embodying the principles and concepts of the present invention and generally designated by the reference numeral 10 will be described.

As best illustrated in FIGS. 1 through 4, the flag pole support apparatus 10 generally comprises a bracket assembly 11 adapted to removably fasten to an object 40, and a support assembly 23 removably mounted to the bracket assembly 11 and adapted to support a flag pole 38. The bracket assembly 11 includes a planar member 12 having a front side 13 and a back side 14 and also having holes 16 spaced apart and disposed proximate to a perimeter 15 of and through the planar member 12, and also includes fasteners 37 removably disposed through the holes 16 for removably fastening the planar member 12 to the object 40. The bracket assembly 11 further includes a plate 20 having holes 22 spaced apart and disposed proximate to a perimeter 21 of and through the plate 20. The fasteners 37 are removably disposed through the holes 22 of the plate 20. The planar member 12 in cooperation with the plate 20 are sandwiched about the object 40 when the bracket assembly 11 is removably mounted to the object 40. The bracket assembly 11 also includes a tubular extension 17 conventionally disposed upon the front side 13 of the planar member 12 and extending outwardly generally perpendicular to the planar member 12. The tubular extension 17 has a side wall 18 with holes 19 spaced entirely about and disposed through the side wall 18.

The support assembly 23 includes an elongated support member 24 having an open top end 25, a closed bottom end 26, a bore 27 disposed therein through the open top end 25 and also includes a side wall 28 for supporting a flag pole 38 in the bore 27 of the elongated support member 24. The support assembly 23 further includes a sleeve support member 29 securely and conventionally attached to the side wall 28 of the elongated support member 24 proximate to the closed bottom end 26. The sleeve support member 29 has a planar main portion 30 and opposed end portions 31, 32 which are angled relative to the planar main portion 30 with the elongated support member 24 partially disposed between and securely and conventionally attached to the opposed end portions 31, 32. The support assembly 23 further includes a sleeve 33 conventionally attached to and extending outwardly generally perpendicular to the planar main portion 30. The sleeve 33 is removably retained about the tubular extension 17. The sleeve 33 has a side wall 34 with holes 35 spaced entirely about and disposed through the side wall 34 of the sleeve 33. The support assembly 23 also includes a pin 36 removably extended in and through the holes 19, 35 of the sleeve 33 and the tubular extension 17 to secure the sleeve 33 and the support assembly 23 to the tubular extension 17 and the bracket assembly 11. The elongated support member 24 is rotatable relative to the bracket assembly 11 and is selectively extendable vertically and horizontally relative to a ground as desired.

In use, the bracket assembly 11 is removably mounted to the object 40. The support assembly 23 is removably and rotatably to the bracket assembly 11. The flag pole 38 is removably supported on the support assembly 23. The flag pole 38 is removably inserted into the elongated support member 24. The sleeve 33 is removably and securely received about the tubular extension 17 with the elongated support member 24 and the flag pole 38 disposed vertically relative to a ground. As another embodiment, the sleeve 33 is removably and securely received about the tubular extension 17 with the elongated support member 24 disposed horizontally relative to a ground and the flag pole 38 removed from the elongated support member 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the flag pole support apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A flag pole support apparatus comprising:
   a bracket assembly adapted to removably fasten to an object, said bracket assembly including
      a planar member having a front side and a back side and also having holes spaced apart and disposed proximate to a perimeter of and through the planar member, and also includes fasteners removably disposed through the holes for removably fastening the planar member to the object,
      a plate having holes spaced apart and disposed proximate to a perimeter of and through the plate, wherein the fasteners are removably disposed through the holes of the plate, wherein the planar member in cooperation with the plate are sandwiched about the object when the bracket assembly is removably mounted to the object,
      a tubular extension disposed upon the front side of the planar member and extending outwardly generally perpendicular to the planar member, wherein the tubular extension has a side wall with holes spaced entirely about and disposed through the side wall; and
   a support assembly removably mounted to the bracket assembly and adapted to support a flag pole, said support assembly including an elongated support member having an open top end, a closed bottom end, a bore disposed therein through the open top end and also includes a side wall for supporting a flag pole in the bore of the elongated support member, the bore being positioned in a plane parallel to and spaced from the planar member of the bracket assembly.

2. The flag pole support apparatus as described in claim 1, wherein the support assembly further includes a sleeve support member securely attached to the side wall of the elongated support member proximate to the closed bottom end.

3. The flag pole support apparatus as described in claim 2, wherein the sleeve support member has a planar main portion and opposed end portions which are angled relative to the planar main portion with the elongated support member partially disposed between and securely attached to the opposed end portions.

4. The flag pole support apparatus as described in claim 3, wherein the support assembly further includes a sleeve attached to and extending outwardly generally perpendicular to the planar main portion, wherein the sleeve is removably retained about the tubular extension.

5. The flag pole support apparatus as described in claim 4, wherein the sleeve has a side wall with holes spaced entirely about and disposed through the side wall of the sleeve.

6. The flag pole support apparatus as described in claim 5, wherein the support assembly also includes a pin removably extended in and through the holes of the sleeve and the tubular extension to secure the sleeve and the support assembly to the tubular extension and the bracket assembly, wherein the elongated support member is rotatable relative to the bracket assembly and is selectively extendable vertically and horizontally relative to a ground as desired.

* * * * *